(12) United States Patent
Evreinov et al.

(10) Patent No.: US 9,789,896 B2
(45) Date of Patent: Oct. 17, 2017

(54) HAPTIC DEVICE

(71) Applicants: TAMPEREEN YLIOPISTO, Tampereen yliopisto (FI); FUKOKU CO., LTD., Ageo-shi, Saitama (JP)

(72) Inventors: Grigori Evreinov, Tampere (FI); Ahmed Farooq, Tampere (FI); Roope Raisamo, Tampere (FI); Arto Hippula, Tampere (FI); Daisuke Takahata, Saitama (JP)

(73) Assignees: TAMPEREEN YLIOPISTO, Tampereen Yliopisto (FI); FUKOKU CO., LTD., Saitama (JP)

( * ) Notice: Subject to any disclaimer, the term of this patent is extended or adjusted under 35 U.S.C. 154(b) by 0 days.

(21) Appl. No.: 14/794,291

(22) Filed: Jul. 8, 2015

(65) Prior Publication Data
US 2016/0009317 A1    Jan. 14, 2016

(30) Foreign Application Priority Data

Jul. 9, 2014  (JP) .................................. 2014-141265

(51) Int. Cl.
B62D 1/06      (2006.01)
B62D 1/04      (2006.01)
B60Q 9/00      (2006.01)

(52) U.S. Cl.
CPC .............. *B62D 1/06* (2013.01); *B62D 1/046* (2013.01); *B60Q 9/00* (2013.01)

(58) Field of Classification Search
CPC .................................. B62D 1/06; B62D 1/046
USPC .......................................................... 701/36
See application file for complete search history.

(56) References Cited

U.S. PATENT DOCUMENTS

| | | | |
|---|---|---|---|
| 5,782,873 | A | 7/1998 | Collins |
| 6,032,074 | A | 2/2000 | Collins |
| 6,812,833 | B2 | 11/2004 | Rothkop et al. |
| 7,077,015 | B2 | 7/2006 | Hayward et al. |
| 7,321,311 | B2 | 1/2008 | Reith et al. |
| 7,375,454 | B2 | 5/2008 | Takasaki |

(Continued)

FOREIGN PATENT DOCUMENTS

| | | |
|---|---|---|
| DE | 102006025852 | 12/2007 |
| EP | 1733949 | 12/2011 |

(Continued)

OTHER PUBLICATIONS

EPO english translation of wo 2007066513 a1.*

(Continued)

*Primary Examiner* — Yazan Soofi
(74) *Attorney, Agent, or Firm* — Andrew M. Calderon; Roberts Mlotkowski Safran Cole & Calderon, P.C.

(57) ABSTRACT

One embodiment of the present invention provides a haptic device including a flexible and deformable tube, a liquid or gel-like substance, a sensor and an actuator. The flexible and deformable tube is affixed to a grip area to be gripped by a user. The liquid or gel-like substance is sealed within the tube and configured to transmit a pressure or/and pressure vibration vibration/pressure therethrough. The sensor is configured to detect the pressure or/and pressure vibration vibration/pressure generated in the tube. The actuator is configured to generate a haptic signal in the tube and/or the substance so as to be transmitted to the user.

27 Claims, 4 Drawing Sheets

(56) References Cited

U.S. PATENT DOCUMENTS

| | | | |
|---|---|---|---|
| 8,040,223 B2 | 10/2011 | Mortimer et al. | |
| 8,362,882 B2 | 1/2013 | Heubel et al. | |
| 8,364,342 B2 | 1/2013 | Springer et al. | |
| 8,378,797 B2 | 2/2013 | Pance et al. | |
| 8,564,424 B2 | 10/2013 | Evarts et al. | |
| 8,619,063 B2 | 12/2013 | Chaine et al. | |
| 8,868,295 B2 | 10/2014 | Jeong | |
| 2002/0162416 A1 | 11/2002 | Gemma | |
| 2005/0239075 A1 | 10/2005 | Yanagidaira et al. | |
| 2006/0278034 A1* | 12/2006 | Daly | B62D 1/06 74/552 |
| 2009/0128305 A1 | 5/2009 | Mortimer et al. | |
| 2010/0164324 A1* | 7/2010 | Kim | H01G 5/16 310/318 |
| 2010/0307900 A1 | 12/2010 | Choi et al. | |
| 2011/0035100 A1* | 2/2011 | Sanma | B60K 35/00 701/36 |
| 2011/0125002 A1 | 5/2011 | Ershov et al. | |
| 2011/0245643 A1 | 10/2011 | Lisseman et al. | |
| 2011/0246028 A1* | 10/2011 | Lisseman | B60K 28/066 701/45 |
| 2012/0150388 A1 | 6/2012 | Boissonnier et al. | |
| 2013/0022209 A1 | 1/2013 | Tomimori et al. | |
| 2013/0282117 A1* | 10/2013 | Van Heugten | A61F 2/1624 623/6.22 |
| 2015/0123947 A1* | 5/2015 | Jubner | G06F 3/04842 345/175 |

FOREIGN PATENT DOCUMENTS

| | | |
|---|---|---|
| JP | 2005234704 | 9/2005 |
| JP | 2006056494 | 3/2006 |
| JP | 2009045077 | 3/2009 |
| JP | 2009142576 | 7/2009 |
| WO | WO-2007066513 | 6/2007 |
| WO | WO 2007066513 A1 * | 6/2007 ........... A61B 5/0245 |
| WO | WO-2013076018 | 5/2013 |

OTHER PUBLICATIONS

Arai et al., "Transparent Tactile Feeling Device for Touch-Screen Interface", Proceedings of the 2004 IEEE International Workshop, Sep. 2004, 6 pages.

Gennisson et al., "Assessment of Elastic Parameters of Human Skin Using Dynamic Elastography", IEEE, vol. 51, No. 8, Aug. 2004, 10 pages.

Mortimer et al., "Vibrotactile transduction and transducers", Engineering Acoustics, Acoustical Society of America, 2007, 8 pages.

Weissman, "Modeling of Micro-scale Touch Sensations for use with Haptically Augmented Reality", Rochester Institute of Technology, 2010, 93 pages.

Tanaka et al., "Active haptic sensation for monitoring skin conditions", Journal of Materials Processing Technology 161, 2005, 5 pages.

Lin et al., "Wave Propagation through Fluid Contained in a Cylindrical, Elastic Shell", The Journal of the Acoustical Society of America, vol. 28, No. 15, Nov. 1956, 12 pages.

Jaedong Lee et al., "Rich Pinch: Perception of Object Movement with Tactile Illusion", IEEE Transactions on Haptics, vol. 9, No. 1, Jan.-Mar. 2016, 10 pages.

Jaeyoung Park et al., "Rendering Moving Tactile Stroke on the Palm Using a Sparse 2D Array", EuroHaptics 2016, Part I, LNCS 9774, Springer International Publishing Switzerland, 2016, 10 pages.

Siyan Zhao et al., "Intermanual Apparent Tactile Motion on Handheld Tablets", 2015 IEEE World Haptics Conference (WHC), Northwestern University, Jun. 22-26, 2015, Evanston, Il, USA, 7 pages.

* cited by examiner

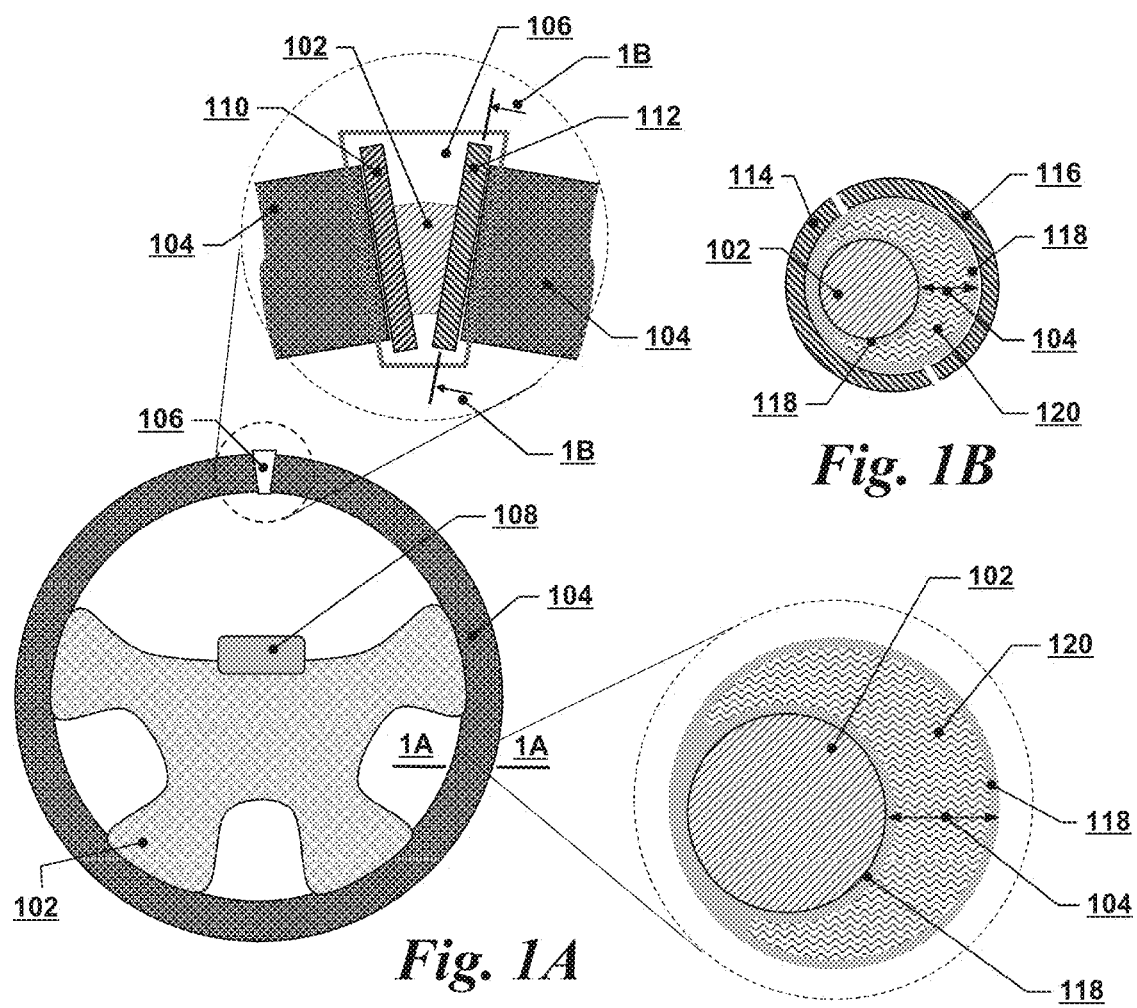
Fig. 1B
Fig. 1A
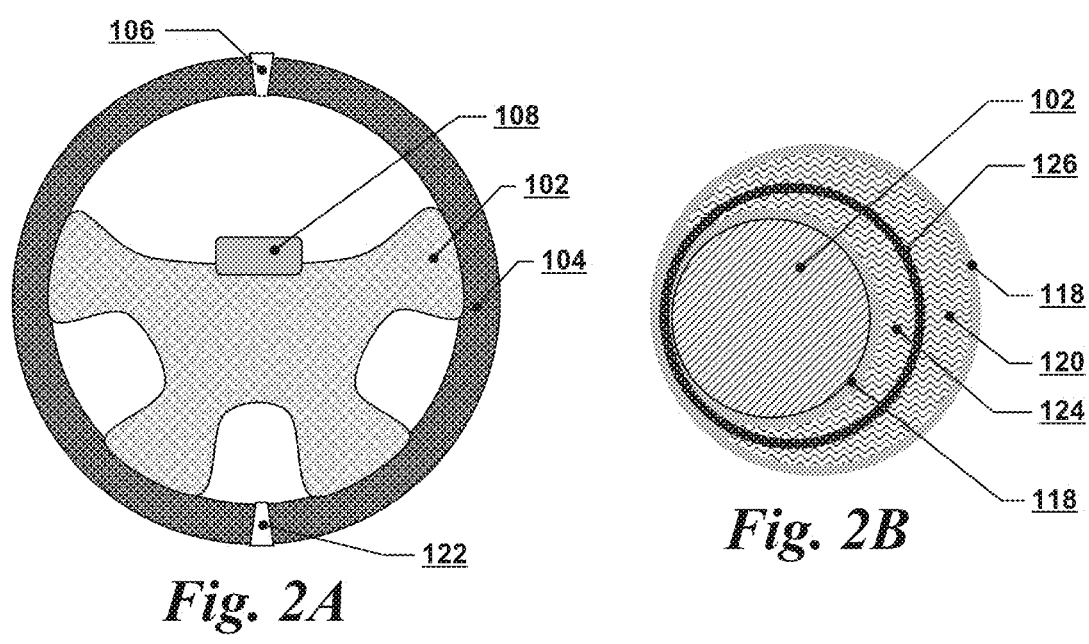
Fig. 2A
Fig. 2B

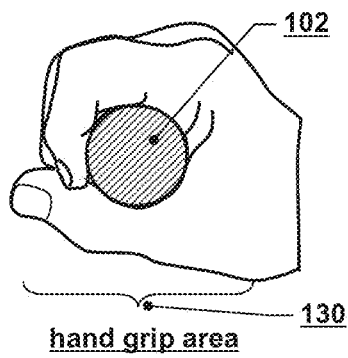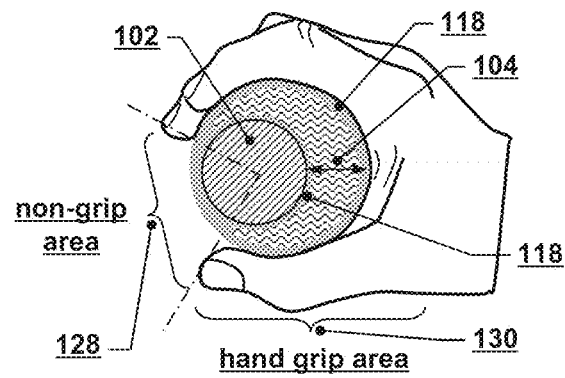
Fig. 3A   Fig. 3B
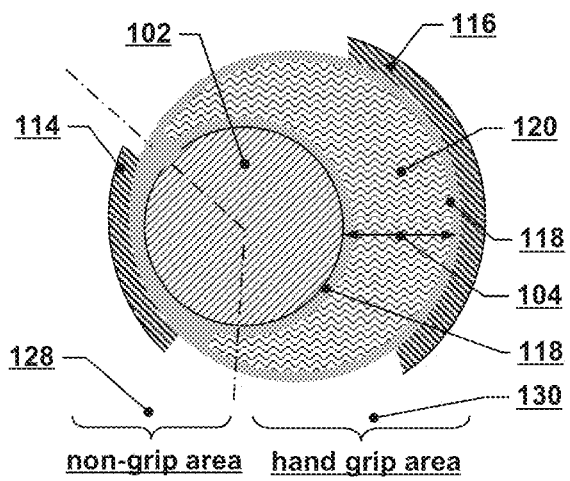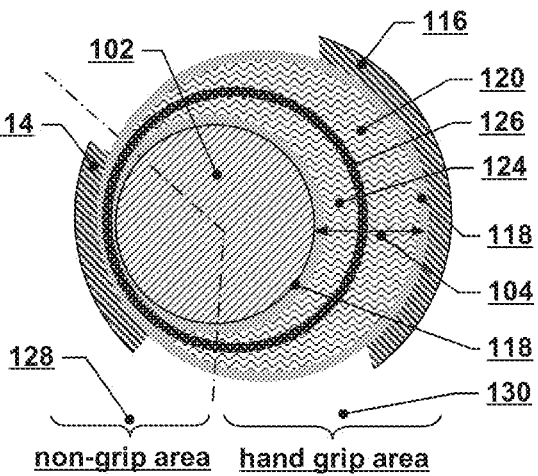
Fig. 4A   Fig. 4B

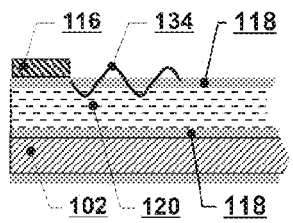
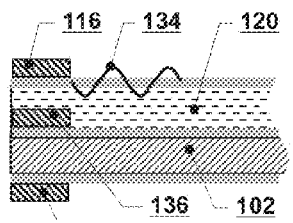
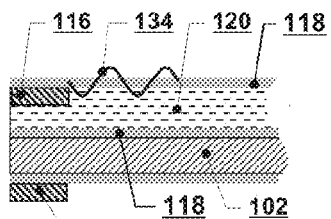
*Fig. 7A*   *Fig. 7B*   *Fig. 7C*
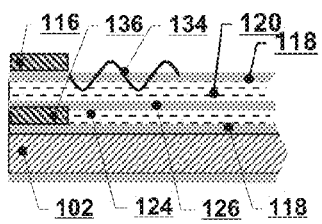
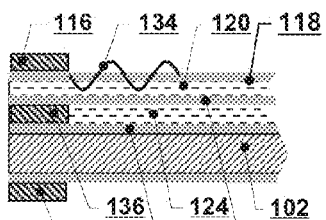
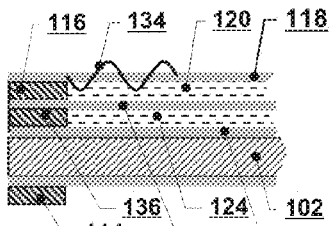
*Fig. 7D*   *Fig. 7E*   *Fig. 7F*
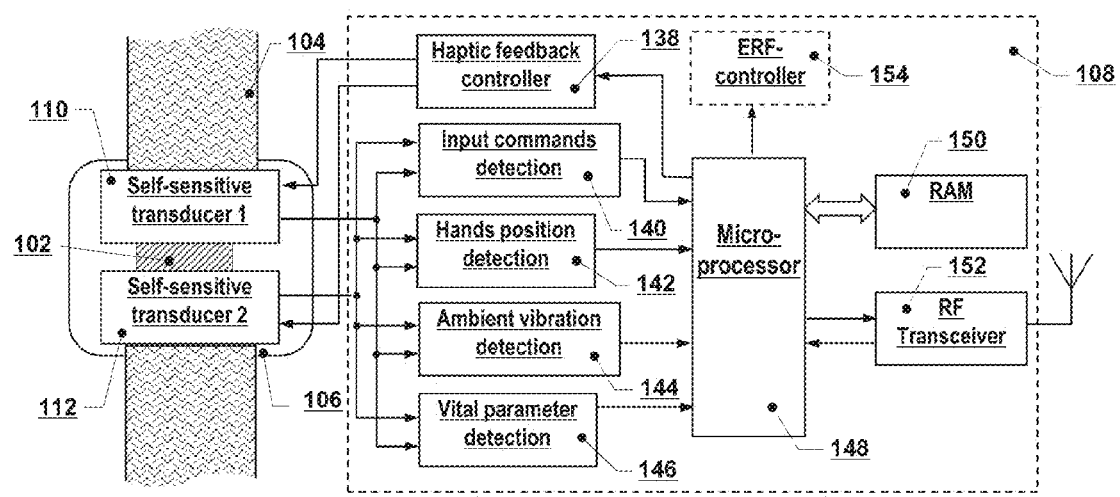
*Fig. 8*

HAPTIC DEVICE

CROSS-REFERENCE TO RELATED APPLICATION(S)

This application claims priority from JP Patent Application No. 2014-141265 filed on Jul. 9, 2014, the entire contents of which are incorporated herein by reference.

TECHNICAL FIELD

The present invention relates generally to a haptic device, and more particularly to a steering wheel cover assembly and sensors and haptic transducers affixed thereto.

BACKGROUND ART

Conventional steering wheels in vehicle present a bimanual manipulandum with variable locations to grasp a wheel in different situations. Bimanual steering technique is critical for driving safety. However, in contrast to airbags, the capability of detecting the driver's hands position during vehicle operation is not yet a prerequisite for the steering wheel design and manufacture. Nevertheless, increasing functionality of steering wheels and driving safety is of great interest in an automotive industry. For this reason, our goal is to increase functionality of the steering wheel covering by optimizing configuration of the cover assembly as a cost effective and informative surface for enabling driver interaction with in-car installed systems and devices.

Different solutions for hands position detection on the steering wheel have been considered and disclosed (e.g., U.S. Pat. No. 8,564,424-B, U.S. Pat. No. 7,321,311-B, US-2011-246028-A). However, these solutions are based on a sensor array incorporated into the covering or directly into the steering wheel body. Multiple sensors should have a wireless connection with a signal processor. Such an embodiment would be too expensive considering it is only targeted at capturing hands position. Wired sensor network is also expensive for manufacturing when motivated exclusively to realize the goal of hands position detection.

The sensors embedded or/and coupled with a vehicle steering wheel can detect biological parameters (vital sign related) of driver. For example, there is disclosed a sensor assembly mounted in the steering wheel (e.g., US-2011-125002-A, US-2011-245643-A, WO-2007-066513-A, WO-2013-076018-A, DE-10-2006-025852-A, JP-2009-045077-A). The sensor assembly includes electrodes configured to measure biological parameters of a driver in the vehicle such as heart rate, skin capacitance, skin temperature, respiration rate, and other parameters utilized to determine a driver's state or condition. However, the configuration of electrodes and measurement technique (e.g., for heart rate) requires that both driver's hands grasp the pair of electrodes placed in opposite segments of the wheel, simultaneously. This way of measurement of a biological parameter cannot be applicable in many situations for safety driving.

WO-2013-076018-A discloses optical sensors and conductive electrodes arranged on a steering wheel in specific locations to detect heart/respiration activity or/and ECG signals. The sensor surface area is formed by the actuation surface of a push-button switch that can be a shifting paddle for a gearshift transmission. The specific location of sensors can have an impact on the natural activity of the driver and prevent continuous monitoring of biological informative parameters.

To continuously detect the heart rate even if a driver operates a steering wheel with one hand, ECG-related dielectric potential generated between a steering electrode and a reference electrode due to press contact with the human body may be measured (e.g., JP-2009-142576-A, US-2013-022209-A). The reference electrode can be installed on the upper-part of seat while the lower-part seat would be grounded, on the backrest of the seat or arranged on an arbitrary location. However, these solutions cannot guarantee a compensation of a local muscle activity generated by fingers/hand squeezing the steering wheel, as this local activity does not present under the reference electrode.

Another functionality that can be integrated with the steering wheel is a tactile input and feedback techniques. US-2012-150388-A proposes an array of vibration sensors fixed to a steering wheel to realize a pie-like menu of commands for interaction with in-car installed mobile devices such as radio, cruise control, phone and others by tapping a particular section of the steering wheel. As it was already discussed in relation to a sensor array for the hands position detection, manufacturing multi-function steering wheels is expensive because of the complexities of manufacturing caused by sensor arrangement and their cabling, even with an intermediate micro-controller processing the information collected by distributed sensors and mounted in/near air bag.

Tactile input (rotary control knobs and buttons) can also be accompanied with a vibration-based tactile feedback (e.g., U.S. Pat. No. 8,364,342-B). Tactile/haptic feedback to warn of collision detection was disclosed (e.g., U.S. Pat. No. 6,812,833-B). The tactile feedback mechanism was adapted to provide a tactile response upon detection of a signal from the vehicle proximity sensor system of the presence of a second vehicle. Moreover, vibrators affixed to a steering wheel can be used for getting rid of stress while driving (e.g., JP-2006-056494-A, US-2002-162416-A). However, vibration for stress relief should not distract and still be perceived at any location of driver's hand.

US-2010-307900-A discloses an active skin for conformable tactile interface. In fact, such an artificial skin could be used, to realize some of mentioned above functionalities being applied as intelligent covering for the steering wheel. However, the concept and manufacturing of the artificial skin for the steering wheel is not free of flaws, especially linked with the propagation of mechanical energy of tactile stimuli to the skin receptors to compensate for disturbances caused by driving conditions, as well as variable threshold of receptors of the human skin to tactile stimuli, and testing vital parameters in the contact area.

Parameters of the human skin vary significantly and affected by many different factors of physical, physiological (humoral), and psychological nature, and by conditions of tactile stimulation.

Some efforts have already been undertaken to improve the conditions for propagation of mechanical energy of tactile stimuli to skin receptors (e.g., Arai F. et al. "*Transparent tactile feeling device for touch-screen interface*" Proc. of the 2004 IEEE Int. Workshop on Robot and Human Interactive Communication, 2004, 527-532, Weissman, A. W. "*Modeling of Micro-scale Touch Sensations for use with Haptically Augmented Reality*" MSc. Thesis, Rochester Inst. of Technology, Rochester, N.Y., USA, 2010, JP-2005-234704-A, U.S. Pat. No. 7,375,454-B, U.S. Pat. No. 8,362,882-B) by placing actuators in a direct contact with human skin (smart fabrics/e-textiles and coverings), through compensation/suppression of disturbances, external noise and surround vibrations by making an exact (easy distinguishable) waveform of stimuli in a specific location due to detection of tactile stimuli propagation to a destination field of contact (e.g., U.S. Pat. No. 8,378,797-B), or by observing the result of skin deformation (variations in skin strain) in the field of contact and adapting the applied magnitude of tactile stimuli (e.g., U.S. Pat. No. 7,077,015-B).

However, being deformed skin receptors might be blocked when e.g., fingers grip a rigid surface or fingertips froze, or protected with gloves. Even for levels of energy alterations which significantly exceed 24 dB above the skin sensitivity, the sensory threshold might be too high, by making the proposed solutions inefficient. Investigations into the mechanical impedance of the human skin have shown a nonlinear increase in stiffness when pressure was produced against the contact surface until a maximum skin indentation of approximately 3 mm (e.g., Mortimer B. J. P. et al. "*Vibrotactile transduction and transducers*" J. Acoust. Soc. Am., 2007, 121(5), 2970-2977).

Interaction through elastomeric material covering a stiff surface and with a density higher than human skin will squeeze the skin and increase the perceptual threshold by damping the response of skin receptors to tactile stimuli. Depending on a loss modulus, elastomeric materials can absorb energy of external vibration (e.g., US-2006-278034-A, EP-1733949-B) as well as applied stimuli by changing their meaning. On the other hand, the fluidic substance can mediate blood flow pulse vibrations to the sensor and vibration stimuli (aka feedback) to the driver's skin.

There have been some inventions made for improving the sensory parameters of touch, in particular, to lower the threshold of skin receptors. For example, a bias signal may be applied to the skin before the informative (tactile) stimuli (e.g., U.S. Pat. No. 5,782,873-A, U.S. Pat. No. 6,032,074-A, U.S. Pat. No. 8,040,223-B, US-2009-128305-A). However, such an approach does not eliminate the problems of signal propagation to tactile receptors for sub-sensory vibrational stimuli that has to change sensitivity of the skin within the predefined time interval as well as transmission of physiological signals from the hand skin to sensors.

The coverings, which have a density of the surface of interaction similar to the density of hypodermis of the human skin, that is typically 1100 kg/m3 (e.g., Gennisson, J.-L. et al. "*Assessment of Elastic Parameters of Human Skin Using Dynamic Elastography*" IEEE Trans. on Ultrasonics, Ferroelectrics, and Freq. Control, 2004, 51(8), 980-989) and regulated viscosity of the fluidic substance, could be more universal technical solution for improving the sensory parameters of touch and haptic/tactile information imaging. Wherein, viscosity of the fluidic (magneto-/electro-rheological) substance can be altered with an electrical current or magnetic field to adapt for recording vital parameter such as arterial pulses.

By taking into consideration all mentioned above requirements and techniques we disclose a cost effective arrangement of self-sensing transducers (e.g., US-2010-164324-A) operating as actuators and sensors through elastomeric covering of the steering wheel filled in with fluidic substance mediating transmission of vital signs and haptic events.

SUMMARY OF INVENTION

An aspect of the present invention provides a haptic device including a flexible and deformable tube, a liquid or gel-like substance, a sensor and an actuator. The flexible and deformable tube is affixed to a grip area to be gripped by a user. The liquid or gel-like substance is sealed within the tube and configured to transmit a pressure or/and pressure vibration therethrough. The sensor is configured to detect the pressure or/and pressure vibration generated in the tube. The actuator is configured to generate a haptic signal in the tube and/or the substance so as to be transmitted to the user.

According to the above-mentioned configuration, it is possible to provide the haptic device which can be suitably mounted on a grip area to be gripped by a user.

BRIEF DESCRIPTION OF DRAWINGS

FIGS. 1A and 1B illustrate the haptic covering according to an embodiment in which two self-sensing transducers are mounted on the opposite ends of the flexible and deformable toroidal tube.

FIGS. 2A and 2B illustrate other examples of the haptic covering according to the embodiment. FIG. 2A illustrates the case in which the flexible and deformable covering is divided into two equal segments such that four self-sensing transducers in total are mounted on the opposite ends of the tube segments. FIG. 2B cross-sectionally illustrates each segment of the covering in which the toroidal tube is composed of two eccentrically-arranged portions.

FIGS. 3A and 3B illustrate states in which the steering wheel without or with the haptic covering is gripped by the driver.

FIGS. 4A and 4B illustrate further other examples of the haptic covering according to the embodiment in each of which several self-sensing transducers are asymmetrically mounted on the shell of the haptic covering.

FIGS. 7A to 7F sectional views illustrating arrangements of the self-sensing transducers or arrangements of the sensors and the actuators.

FIG. 8 illustrates a functional block diagram of the microprocessor unit of the haptic covering.

DETAILED DESCRIPTION OF EMBODIMENT

Figure 5:
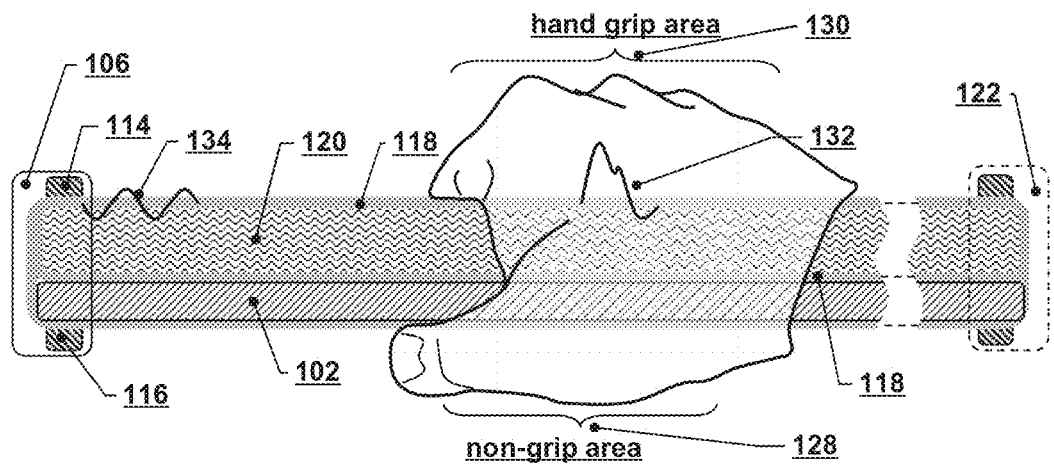
FIG. 5 is a longitudinal sectional view about the steering wheel illustrating an exemplary relationship between the driver's gripping location and the positions of the self-sensing transducers, with the haptic covering as illustrated in FIGS. 1A and 1B.

The embodiments will be described with reference to the accompanying drawings. In the drawings and the description, the same reference numbers are used to refer to the same or like parts.

There is disclosed a cost effective solution for multi-function steering wheel covering that allows to detect the hands' position on a steering wheel, to continuously monitor vital signs of driver, and to input commands and displaying haptic information during interaction with in-car systems and devices.

In particular, the haptic covering for steering wheel consists of an elastic and deformable toroidal tube filled in with the liquid or gel-like substance that can efficiently transfer mechanical vibrations in a range of about 0-300 Hz (haptic and physiological signals) between human hand and self-sensing transducers affixed to the shell. A minimum number of transducers located in one or two locations allows to detect vibration, pressure and torque by providing the control system with information related to the human grasp (fingers location and pressure), behavioral activity and vital signs of driver. On the other hand, the same transducers are able to communicate to the driver guiding and warning signals, and other information through the skin contact mechanical stimulation. A microprocessor unit mounted at a backside of the air bag module or at other suitable location collects the data from self-sensing transducers, processes them and is able to generate various haptic patterns by supporting wireless bidirectional communication with the vehicle's host processor. The microprocessor unit is also able to alter physical properties of the liquid substance (such as viscosity) to improve the conditions of propagation for haptic signals and physiological signals by filtering physiological signals in the most efficient way.

As shown in FIGS. 1A and 1B, a flexible and deformable toroidal tube is affixed to the steering wheel rim 102 with a gap 106 by shaping a covering 104. The toroidal tube has external and internal shells indicated as surfaces 118 (a sectional view 1B). The external and internal shells of the toroidal tube are eccentrically arranged. A space between those surfaces is filled in with a liquid or gel-like substance 120 (a sectional view 1A). Within a gap 106 two self-sensing transducers 110 and 112 are affixed to the lateral surface of both ends of the tube 104 shaping two segments 114 and 116 (a sectional view 1B) both of them can be used as sensors and actuators. The liquid substance 120 is preferably a silicone-based electrorheological fluid (ERF) which viscosity can be changed to improve the conditions of propagation for haptic signals and recording physiological signals. In particular, changing viscosity can be used as a part of adaptive filtering mechanism for viscous damping to control ambient vibrations, torque and extra waves traveling along the covering during steering wheel rotations and after applying tactile stimuli.

Due to elastic and deformable covering, driver's hands present two inertial masses which continuously generate patterns of vibration in a kind of shear waves of pressure ($P_{HandL}$ or/and $P_{HandR}$) traveling together with vital parameter-related acoustic signals or vibrations ($P_{VpulseL}$ and $P_{VpulseR}$) along the liquid or gel-like substance from the grasping location in both directions to the self-sensing transducers 110 and 112. Ambient vibrations in a kind of shear waves of pressure ($P_{AV}$) are also traveling together with $P_{HandL}$ or/and $P_{HandR}$ along the liquid substance and mostly presented in the same phase. Due to an eccentric arrangement of the external and internal shells of the toroidal tube, each segment 114 and 116 of transducers 110 and 112 gets different portions of vibration signals generating by the hand mass ($P_{HandL}$ or/and $P_{HandR}$) and ambient vibrations ($P_{AV}$). Thus, due to cross-correlation and phase analysis of signals, it is possible to detect the hands' position gripping the steering wheel.

However, to increase the accuracy of the detection the left and right hand position, the toroidal tube of covering can be split into two equal segments (FIG. 2A) by the gap 122. Moreover, the space between two eccentric surfaces of the toroidal tube can be split into two portions 120 (external room) and 124 (internal room) by an additional elastic diaphragm 126 wherein both portions of spaces can be filled in by the substance with different density. The solution is presented at FIG. 2B. Due to different density of two substances, pressure waves ($P_{HandL}$ and $P_{HandR}$) and vital parameter-related acoustic signals or vibrations ($P_{VpulseL}$ or/and $P_{VpulseR}$) will be fully attenuated within an internal room 124. Such an arrangement will also increase difference between signals recorded by two segments 114, 116 of self-sensing transducers 110 and 120.

FIG. 3A illustrates a state in which the steering wheel rim 102 without the haptic covering is gripped, and FIG. 3B illustrates a state in which the steering wheel rim 102 with the haptic covering is gripped. As can be seen from FIGS. 3A and 3B, a hand grip area 130 means an external surface of the steering wheel rim 102 or its covering 104 which has a direct contact with the skin. A non-grip area 128 means a portion of an external surface of the covering 104 which cannot be in a direct contact with the skin. Along with asymmetric arrangement of two segments 114 and 116 of each self-sensing transducer 110 and 112 and their opposite counterparts, these segments 114 and 116 can have different geometrical size as indicated in FIGS. 4A and 4B. Such an embodiment can further enhance differences between ambient vibrations ($P_{AV}$) and informative signals of hand position ($P_{HandL}$ or/and $P_{HandR}$) recorded together with vital parameter-related acoustic signals or vibrations ($P_{Vpulse}$) from each hand holding the wheel. Thus, to create efficient filtering mechanism for information related to the human grasp (fingers location and pressure), behavioral activity and vital signs of driver using exclusively a limited number of pressure sensors the steering wheel haptic covering should mediate pressure propagation in a specific way.

Figure 6:
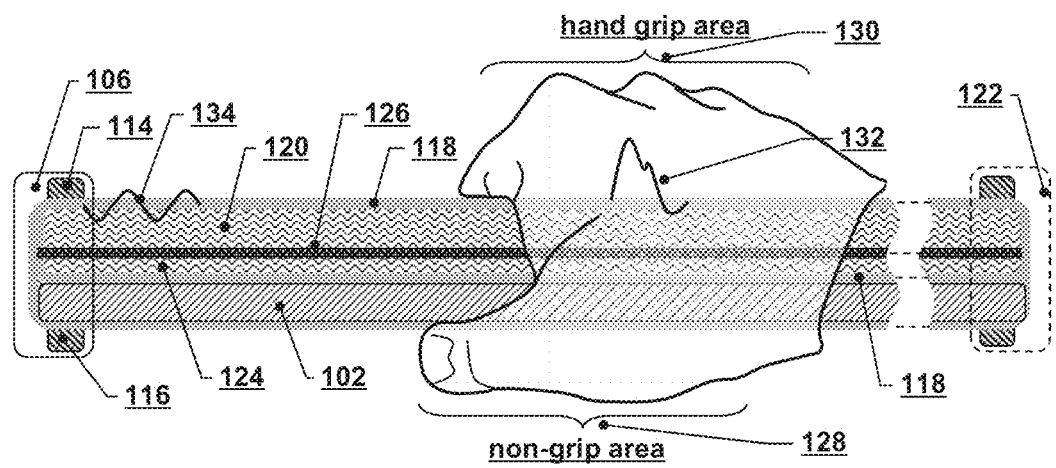
FIG. 6 is a longitudinal sectional view about the steering wheel illustrating an exemplary relationship between the driver's gripping location and the positions of the self-sensing transducers, with the haptic covering in which the toroidal tube is composed of two eccentrically-arranged portions as illustrated in FIG. 2B.

FIG. 5 and FIG. 6 are longitudinal sectional views about the steering wheel with the haptic covering for illustrating areas and location of the human grip with respect to the self-sensing transducers mounted at one or/and the opposite ends of the haptic covering segments. FIG. 5 corresponds to the examples illustrated in FIGS. 1A and 1B or FIG. 4A. FIG. 6 corresponds to the examples as illustrated in FIG. 2B or FIG. 4B. In particular, in the haptic covering of FIG. 6, the space between two eccentric surfaces 118 of the toroidal tube can be split into two portions 120 (external room) and 124 (internal room) by an additional elastic diaphragm 126.

As shown in FIGS. 7A to 7F, those skilled in art can use sensors and actuators affixed/embedded separately to achieve the same result for detecting parameters in question and to present information through the skin contact mechanical stimulation. In particular, FIG. 7A demonstrates a basic embodiment of the steering wheel 102 covering wherein a single self-sensing transducer 116 is mounted on the external face 118 of a flexible and deformable toroidal tube filled in with a liquid or gel-like substance 120. Herewith, the reference sensor of ambient vibrations ($P_{AV}$) is embedded into the processor unit 108 (not shown in this figure). Mechanical skin stimulation of the driver is performing by generating pressure (shear) waves 134 traveling along the external face 118 of steering wheel covering.

To get a component spectrum of ambient vibrations ($P_{AV}$) detected by reference sensor 114 as close as possible to the same component in informative signals the active sensor 136 can be separated from actuator 116 and mounted inside the toroidal tube on the internal surface 118 which covers the steering wheel rim 102 (FIG. 7B). In such an arrangement, the sensor 136 will have a direct contact with a conductive liquid substance, that is, it should be insulated and hermetically sealed. However, its insulation should not attenuate sensitivity to pressure and low frequency vibrations.

A self-sensitive transducer 116 can also be placed on the internal surface of the toroidal tube as shown in FIG. 7C. Further, electrorheological fluid may be used. When the electrorheological fluid is used, unnecessary vibrations can be immediately stopped by appropriately controlling/altering the viscosity of the electrorheological fluid. In this case, for example, components of complex stimuli can be easily discriminated from one another.

As it was already disclosed in FIG. 2B, the space between two eccentric surfaces of the toroidal tube can be split into two portions 120 (external room) and 124 (internal room) by an additional elastic diaphragm 126 wherein both portions of spaces can be filled in by the substance with a different density. Consequently, an arrangement of sensors and transducers in these separated rooms can increase selectivity and optimize mechanism of filtering different components of vibration of the steering wheel covering (e.g., U.S. Pat. No. 8,619,063-B). Referring to FIGS. 7D to 7F, a sensor 136 can detect $P_{AV}$ and ($P_{HandL}$ or $P_{HandR}$), while vital parameter-related acoustic signals or vibrations ($P_{VpulseL}$ and $P_{VpulseR}$) will be fully attenuated within an internal room 124. A self-sensing transducer 116 is able to detect a composite pressure signal that consists of vital parameter-related acoustic signals or vibrations ($P_{VpulseL}$ or/and $P_{VpulseR}$), pressure waves ($P_{HandL}$ or/and $P_{HandR}$) and ambient vibrations $P_{AV}$. The reference sensor 114 can detect ambient vibrations $P_{AV}$ from the steering wheel rim or from the microprocessor unit 108 mounted at a backside of the air bag module or at other suitable location.

FIG. 8 illustrates a functional block diagram of the microprocessor unit 108 for the steering wheel haptic covering 104. The microprocessor unit 108 contains components of active filters for detection of vital parameter-related acoustic signals or vibrations 146, ambient vibration 144, hands position 142, and input commands 140, microprocessor 148 (MP), memory 150, radio-frequency transceiver 152, haptic feedback controller 138 and ERF-controller 154.

The microprocessor 148 supports an adaptive composite correlation-based filtering for the detection of hands position, vital parameter-related acoustic signals or vibrations and input commands generating the specific signals of vibration, while driver is holding the steering wheel, and communicates to the driver guiding and warning signals, and other information through the skin contact mechanical stimulation.

Memory 150 can include semi-permanent memory such as RAM, and/or one or more different types of memory used for storing data. Namely, memory 150 is used for storing any type of data such as templates of vital parameter-related acoustic signals or vibrations and input commands, parameters of vibration feedback signals, a library or database of vibrotactile effects and composite patterns to operate with controller of transducers, parameters of signals needed to operate with controller 154 of electrorheological fluid (ERF).

Consequently, the signals from the MP 148 are transmitted with the RF-transceiver 152 to/from in-car installed central processor unit or/and mobile devices such as radio, cruise control, phone, IVIS and so on. Information needed to be communicated to the driver through haptic channel will be processed and presented accordingly to the use of haptic feedback controller 138, while ERF-controller 154 can continuously operate to improve the conditions for haptic signal propagation. ERF-controller 154 can also be used to compensate for torque and other rotary forces of extra waves within the liquid substance traveling along the covering during steering wheel rotations and after applying tactile stimuli.

The steering wheel covering can also include elements of decorative texture, which should not affect tactile sensitivity of the driver skin and should not attenuate or diminish vibration signals related to monitoring the vital parameter.

While certain embodiments have been exemplified above, these embodiments should not limit the scope of the invention. These embodiments may be variously implemented with omissions, replacements, and/or changes and/or modifications, within the spirit and scope of the invention. For example, although the steering wheel of the vehicle is exemplified in the above embodiments, the present invention may be applied to any kinds of devices, such as a bar-handle of a motorcycle, a control stick of an airplane, a joystick of a game machine, a walking cane, etc. which is to be gripped by a user.

The invention claimed is:

1. A haptic device to be mounted on a grip area to be gripped by a user, the haptic device comprising:
   a flexible and deformable tube affixed to the grip area;
   a liquid or gel-like substance sealed within the tube and configured to transmit a pressure or/and pressure vibration therethrough; and
   a sensor configured to detect the pressure or/and pressure vibration generated in the tube;
   an actuator configured to generate a haptic signal in the tube and/or the substance so as to be transmitted to the user.

2. The haptic device of claim 1,
   wherein the actuator and the sensor are provided as a self-sensing transducer.

3. The haptic device of claim 2,
   wherein the self-sensing transducer is provided at an end of the tube.

4. The haptic device of claim 1,
   wherein the grip area is a rim of a steering wheel.

5. A haptic covering for a steering wheel, comprising:
   a flexible and deformable toroidal tube affixed to a rim of the steering wheel;
   two self-sensing transducers provided in the toroidal tube, configured to detect the pressure or/and pressure vibration within a given frequency range and a given magnitude range, and configured to generate the pressure or/and pressure vibration as a haptic signal;
   a processor unit configured to receive a detection result from the self-sensing transducers, configured to control the self-sensing transducers to generate the haptic signal based on the received detection result, and configured to communicate with an in-car central processing unit.

6. The haptic covering of claim 5,
   wherein the toroidal tube includes external and internal shells eccentrically arranged to define a space therebetween.

7. The haptic covering of claim 6,
   wherein the space is filled in with a substance configured to mediate a propagation of the pressure or/and pressure vibration in both clockwise and counterclockwise directions between a gripping location of a driver and an arrangement position of the self-sensing transducers.

8. The haptic covering of claim 7,
   wherein the substance is a natural or synthetic liquid or gel-like substance having a density similar to a density of a hypodermis of a human skin, and
   wherein the density of the hypodermis of the human skin is about 1100 kg/m$^3$.

9. The haptic covering of claim 8,
   wherein the liquid or gel-like substance is a silicone-based electrorheological fluid having a density similar to the density of the hypodermis of the human skin, and
   wherein a viscosity of the silicone-based electrorheological fluid is alterable to thereby adjust a condition of a propagation of the haptic signal.

10. The haptic covering of claim 8,
wherein a stiffness of the toroidal tube filled in with the liquid or gel-like substance is adjusted to produce a pressure of about 1.5 of an average diastolic arterial pressure of a hand of the driver gripping the steering wheel, so that arterial pulses in peripheral vessels of fingers are detected, and
wherein the average diastolic arterial pressure of a hand of a driver gripping the steering wheel is about 100 mmHg.

11. The haptic covering of claim 5,
wherein the self-sensing transducers are affixed to lateral surfaces of both ends of the toroidal tube, and
wherein the self-sensing transducers are configured to transmit/receive the pressure or/and pressure vibration to/from a gripping location of a driver, and configured to detect an ambient vibration.

12. The haptic covering of claim 5,
wherein one of the self-sensing transducers provided correspondingly with a non-grip area functions as a sensor which detects an ambient vibration,
wherein another one of the self-sensing transducers provided correspondingly with a hand grip area functions not only as a sensor which detects the pressure or/and pressure vibration generated upon contact with a hand of a driver, but also as actuator which generates the pressure or/and pressure vibration as a tactile stimulation to be perceived by the hand of the driver, and
wherein the processor unit is configured to perform an adaptive filtering and a phase analysis using the self-sensing transducers.

13. The haptic covering of claim 5,
wherein the toroidal tube includes external, internal and intermediate shells eccentrically arranged to respectively define external and internal spaces therebetween.

14. The haptic covering of claim 13,
wherein the external space is filled in with a substance configured to mediate a propagation of the pressure or/and pressure vibration in both clockwise and counterclockwise directions between a gripping location of a driver and an arrangement position of the self-sensing transducers.

15. The haptic covering of claim 10,
wherein the substance is a silicone-based electrorheological fluid having a density similar to a density of a hypodermis of a human skin,
wherein a viscosity of the silicone-based electrorheological fluid is alterable to thereby adjust a condition of a propagation of the haptic signal.

16. The haptic covering of claim 15,
wherein the internal space is filled in with a substance configured to mediate a propagation of an ambient vibration, and
wherein the substance sealed in the internal space has a density that is different from the density of the liquid substance of the external space so that a vibration of a vital parameter-related acoustic signal is fully suppressed or largely attenuated.

17. The haptic covering of claim 16,
wherein the substance sealed in the internal space is a silicone-based electrorheological fluid,
wherein a viscosity of the silicone-based electrorheological fluid is alterable to thereby adjust a condition of propagation of the haptic signal.

18. The haptic covering of claim 5,
wherein each of the self-sensing transducers is made up of a sensor and a actuator which a separately provided.

19. The haptic covering of claim 5,
wherein the self-sensing transducers are affixed to the lateral surface inside the toroidal tube and configured to transmit/receive the pressure or/and pressure vibration to/from a gripping location of a driver and to detect ambient vibrations wherein the transducers are insulated from a conductive liquid substance and hermetically sealed while insulation should not have impact on their performance and sensitivity.

20. The haptic covering of claim 5,
wherein the toroidal tube is split into two equal segments, and
wherein the self-sensing transducers are mounted at one end or/and the opposite end of the segments.

21. The haptic covering of claim 5,
wherein the processor unit includes:
an active filter configured to detect a behavioral activity, a vital sign and an ambient vibration;
a microprocessor;
a memory;
a radio-frequency transceiver;
a haptic feedback controller; and
an electrorheological fluid controller.

22. The haptic covering of claim 21,
wherein the memory includes a non-volatile memory,
wherein the memory stores
  templates of vital parameter-related acoustic signals, vibrations and input commands,
  parameters of vibration feedback signals,
  a library or database of vibrotactile effects and composite patterns to operate with a haptic feedback controller, and
  parameters of signals needed to operate with the electrorheological fluid controller.

23. The haptic covering of claim 21
wherein the radio-frequency transceiver is configured to perform a wireless communication with an in-car central processor unit or/and a mobile device.

24. The haptic covering of claim 21,
wherein the microprocessor is configured to perform a cross-correlation and a phase analysis on a signal sent from the transducers, and configured to control the haptic feedback controller to provide the tactile stimulation to a driver as information.

25. The haptic covering of claim 21,
wherein the microprocessor is configured to alter a viscosity of the substance which is sealed in a space within the toroidal tube.

26. The haptic covering of claim 21,
wherein the memory includes a non-volatile memory, and
wherein the memory stores
  templates of vital parameter-related acoustic signals or vibrations,
  behavioral patterns related to input commands,
  parameters of vibration feedback signals,
  a library or database of vibrotactile effects and composite patterns to operate with the haptic feedback controller,
  parameters of signals needed to operate with the electrorheological fluid controller.

27. The haptic covering of claim 5, further including;
a decorative texture.

* * * * *